US011146298B2

(12) United States Patent
Martin

(10) Patent No.: US 11,146,298 B2
(45) Date of Patent: Oct. 12, 2021

(54) SPLIT FREQUENCY BAND SIGNAL PATHS FOR SIGNAL SOURCES

(71) Applicant: Tektronix, Inc., Beaverton, OR (US)

(72) Inventor: Gregory A. Martin, Lake Oswego, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 16/588,580

(22) Filed: Sep. 30, 2019

(65) Prior Publication Data

US 2020/0212945 A1 Jul. 2, 2020

Related U.S. Application Data

(60) Provisional application No. 62/787,212, filed on Dec. 31, 2018.

(51) Int. Cl.
*H04B 1/04* (2006.01)

(52) U.S. Cl.
CPC .................................. *H04B 1/0483* (2013.01)

(58) Field of Classification Search
CPC ........................... H04B 1/0483; H03M 1/1215
See application file for complete search history.

(56) References Cited

U.S. PATENT DOCUMENTS 4,610,023 A * 9/1986 Noso ...................... G10L 15/20
704/233
7,649,485 B1 * 1/2010 Kaplan ................ H03M 1/121
341/155

(Continued)

FOREIGN PATENT DOCUMENTS

WO 2006103585 10/2006

OTHER PUBLICATIONS

European Patent Office, Extended European Search Report and Written Opinion for European Application No. 19220197.8, dated Jun. 4, 2020, 7 pages, Munich, Germany.

*Primary Examiner* — Freshteh N Aghdam
(74) *Attorney, Agent, or Firm* — Miller Nash Graham & Dunn; Andrew J. Harrington

(57) ABSTRACT

A signal generator device includes a digital signal waveform generator to produce a digital signal waveform, a first frequency band signal path having a first frequency band filter to receive the digital signal waveform and to pass first frequency band components of the digital signal waveform, and a first digital-to-analog converter to receive the first frequency band components of the digital signal waveform and to produce a first frequency band analog signal, a second frequency band signal path having a second frequency band filter to receive the digital signal waveform and to pass second frequency band components of the digital signal waveform, a second digital-to-analog converter to receive the second frequency band components of the digital signal waveform and to produce a second frequency band analog signal, and a combining element to combine the first frequency band analog signal and the second frequency band analog signal to produce a wideband analog signal. A method of generating a wideband analog signal includes generating a digital waveform, splitting the digital waveform into at least a first frequency band signal and a second frequency band signal, converting the first frequency band signal into a first frequency band analog signal, converting the second frequency band signal into a second frequency analog signal, and combining the first frequency band analog signal with the second frequency band analog signal to produce the wideband analog signal.

19 Claims, 5 Drawing Sheets

(56) References Cited

U.S. PATENT DOCUMENTS

| | | | | |
|---|---|---|---|---|
| 9,007,250 | B1 * | 4/2015 | Jeraj | H03M 1/662<br>341/144 |
| 10,340,933 | B1 * | 7/2019 | Hovakimyan | H03M 1/1009 |
| 2003/0020644 | A1 * | 1/2003 | Yeap | H03M 1/121<br>341/144 |
| 2004/0252786 | A1 | 12/2004 | McHenry | |
| 2009/0052556 | A1 * | 2/2009 | Fernandez | H03M 1/662<br>375/241 |
| 2010/0128829 | A1 | 5/2010 | Drugge et al. | |
| 2012/0201330 | A1 * | 8/2012 | McHenry | H04B 1/0483<br>375/297 |
| 2017/0077944 | A1 * | 3/2017 | Pagnanelli | H03M 3/358 |

* cited by examiner

SPLIT FREQUENCY BAND SIGNAL PATHS FOR SIGNAL SOURCES

CROSS-REFERENCE TO RELATED APPLICATIONS

This application claims the benefit of U.S. Provisional Pat. App. No. 62/787,212, filed Dec. 31, 2018, the contents of which are hereby incorporated by reference.

TECHNICAL FIELD

This disclosure relates to signal paths for wideband signal sources, more particularly to signal paths that can generate signals spanning from steady-state to very high frequencies.

BACKGROUND

Wideband signal sources generate signals with spectral content spanning from DC and low frequencies to very high frequencies. High-speed serial standards, such as Peripheral Component Interface Express (PCIe) and Ethernet, require higher frequencies with every iteration of the standard. Designing signal path components like digital-to-analog converters (DACs) and amplifiers that can span the full frequency range presents many challenges. Components that are optimized for performance at high frequencies may not have optimal characteristics at low frequencies, and it can be challenging to extend a component that supports wide dynamic range at DC and low frequencies to also support high bandwidth.

Embodiments of the disclosed apparatus and methods address shortcomings in the prior art.

DETAILED DESCRIPTION

As described here, embodiments are directed to split signal paths for signal generators. A digital, wideband signal generator generates a wideband signal. As used here, the term "wideband" means a signal that spans from steady-state, or DC, signals, to very high frequencies, such as those in the Gigahertz range.

The embodiments split the signals between at least two frequency bands, such as a low-frequency band and a high-frequency band, where the difference between the low-frequency band and the high-frequency band depends upon the application for which the signal is being generated. The system may include more than one frequency band. In the case of a low-frequency band, the low-frequency band will include DC signals as well as some spread of lower frequency signals. The high-frequency band would include those signals of higher frequency than the signals in the low-frequency band. The system may include more than two frequency bands.

The discussion here will discuss the bands in terms of low-frequency and high-frequency bands, but there is no intention to limit the bands to that particular implementation and none should be implied. Dividing the signal into low-frequency and high-frequency signals allows the design of the components to be optimized for each range of signals. For example, the components in the high-frequency signal path may be optimized for AC operations at higher frequencies and bandwidths, and the components in the low-frequency signal path may be optimized for low-frequency and DC signal components.

Figure 1:
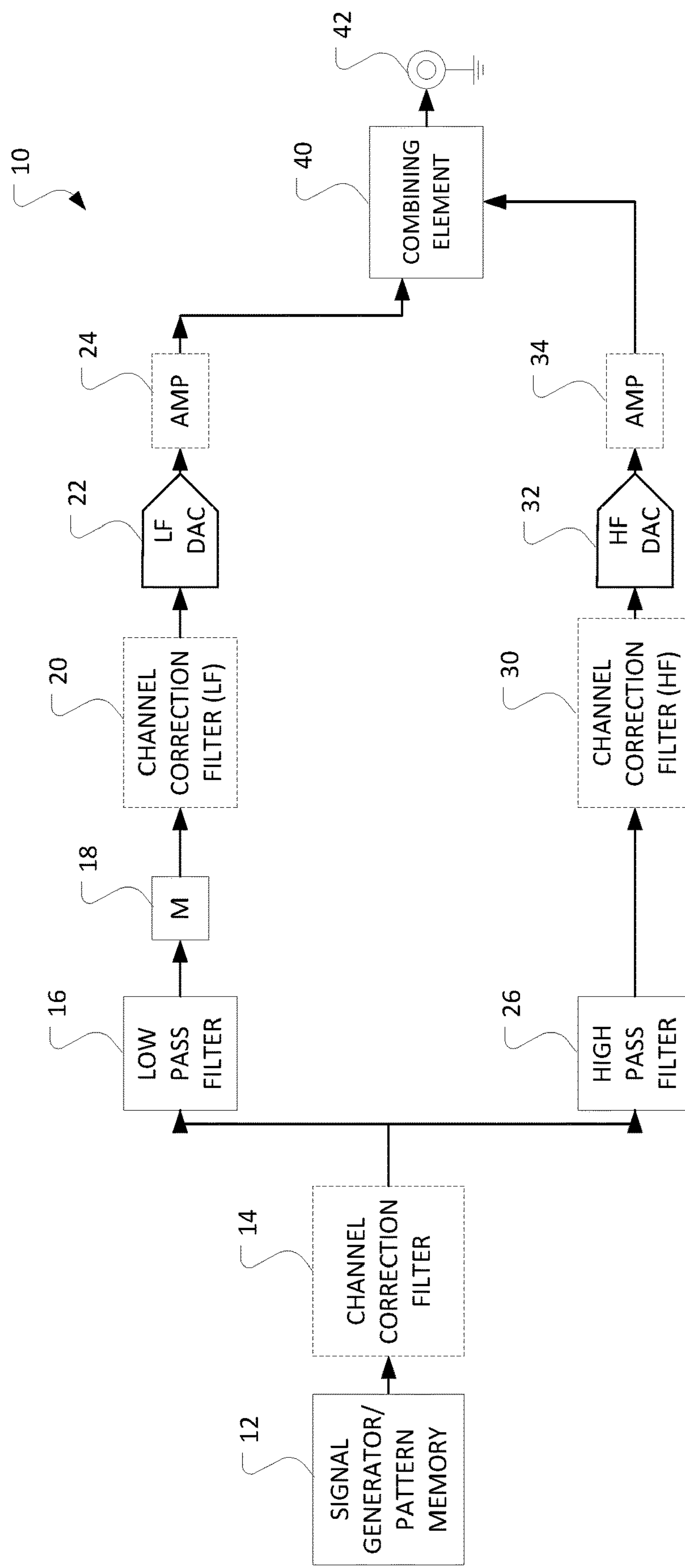
FIG. 1 illustrates an embodiment of a device having a split signal path.

FIG. 1 shows a signal generator device 10. As used here, the term 'device' means a package that contains the necessary elements. The device may be configured in many different ways. For example, all of the elements of FIG. 1 may be contained on one digital signal processor. Alternatively, all of the elements of FIG. 1 may be contained on one digital signal processor, except for the signal generator 12 and the low frequency digital-to-analog (DAC) converter 22. These components may be included in the package but not be a part of the same integrated circuit such as an ASIC or DSP. Similarly, the device may be implemented at least in part as an application specific integrated circuit (ASIC), a field programmable gate array (FPGA), etc.

A signal generator 12 will typically comprise a digital signal waveform source. An optional channel correction filter 14 may smooth out the signal to compensate for characteristics of the signal path components that are common to the high-frequency and low-frequency signal paths. Other channel correction filters may exist in the low-frequency and high-frequency paths. These filters may compensate for the characteristics of the signal path components, including in the high-frequency signal path, the low-frequency signal path, the common output signal through the signal source output, and the desired transmitter equalization response for the channel following the signal source output.

The initially generated signal is then split into two signal paths, each having a determined range of frequencies. In FIG. 1, a low-pass filter 16 separates the low-frequency components of the generated signal to allow the low-frequency path to operate on a low-frequency portion of the signal. This may also involve a decimation filter 18 that downsamples the signal to match the sample rate and bandwidth of the low-frequency DAC 22. The decimation filter 18 may be implemented in the low pass filter 16 by discarding samples to reach the desired sample rate for the low-frequency DAC 22.

Other components, such as another optional channel correction filter 20 may also be in the low-frequency signal path. The low-frequency DAC 22 then converts the low-frequency components of the signal to a low-frequency analog signal. This will eventually be combined with a high-frequency analog signal at the combining element 40, and then provided to the output pin or connector 42. The low-frequency path may include other components, such as the optional amplifier 24.

Similar to the low-frequency path, the high-frequency path has a high-pass filter 26 that separates out the high-frequency signal components. This path may also contain an optional channel correction filter 30. The high frequency DAC 32 converts the digital signal at a sample rate needed to cover the frequency range of the high-frequency DAC to a high-frequency analog signal. The resulting high-frequency analog signal will then be combined with the low-frequency analog signal at the combining element 40. The high-frequency path may also include an optional amplifier 34.

In this manner, each path can be optimized for a narrower band of signals rather than trying to develop components that have to cover the entire range of frequencies in the wideband range. For example, the low-frequency path and components in the low-frequency path can be optimized for low-frequency signals including DC signals, and the high-frequency path and components in the high-frequency path can be optimized for AC signals at high bandwidths.

Figure 2:
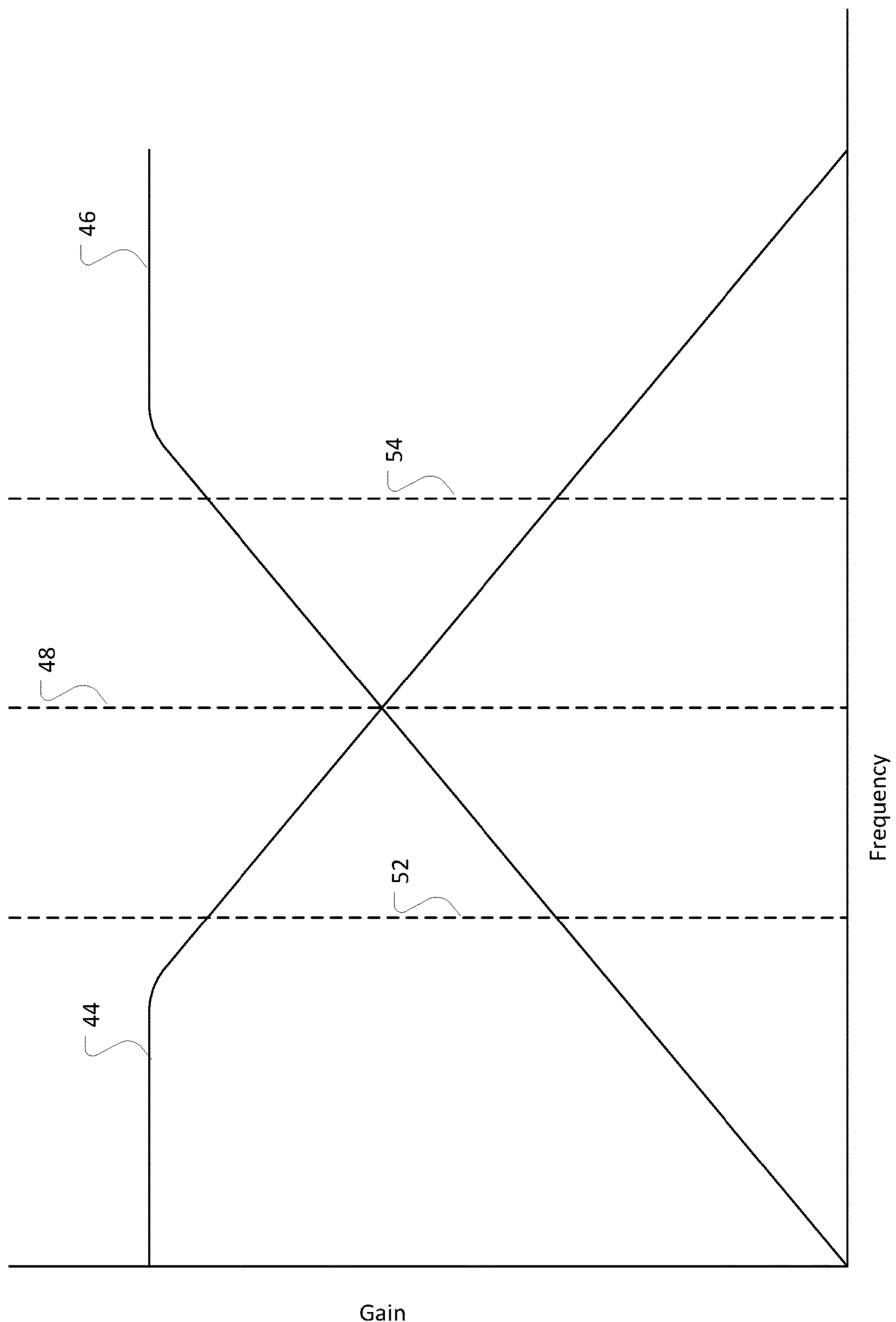
FIG. 2 illustrates an embodiment of filter responses.

The selection of the combining element 40 may depend upon the filter 16, 26 design. For example, the low-pass filter 16 and the high-pass filter 26 may be designed to have the filter response as shown in FIG. 2. The low-pass filter response 44 and the high-pass filter response 46 overlap. The crossover frequency 48 becomes a reference point because the cutoff transitions at 52 and 54 must have a particular ‘distance’ from the crossover frequency so as to not influence the aggregate output frequency response. Also, these responses are designed to sum to 1, as in $H_{LF}(z)+H_{HF}(z)=1$. This eliminates the need for any further equalization or analog filtering to compensate for the transition between both bands. For this case, both the low-pass and high-pass filters will have −6 dB attenuation at the crossover frequency between the bands.

Figure 3:
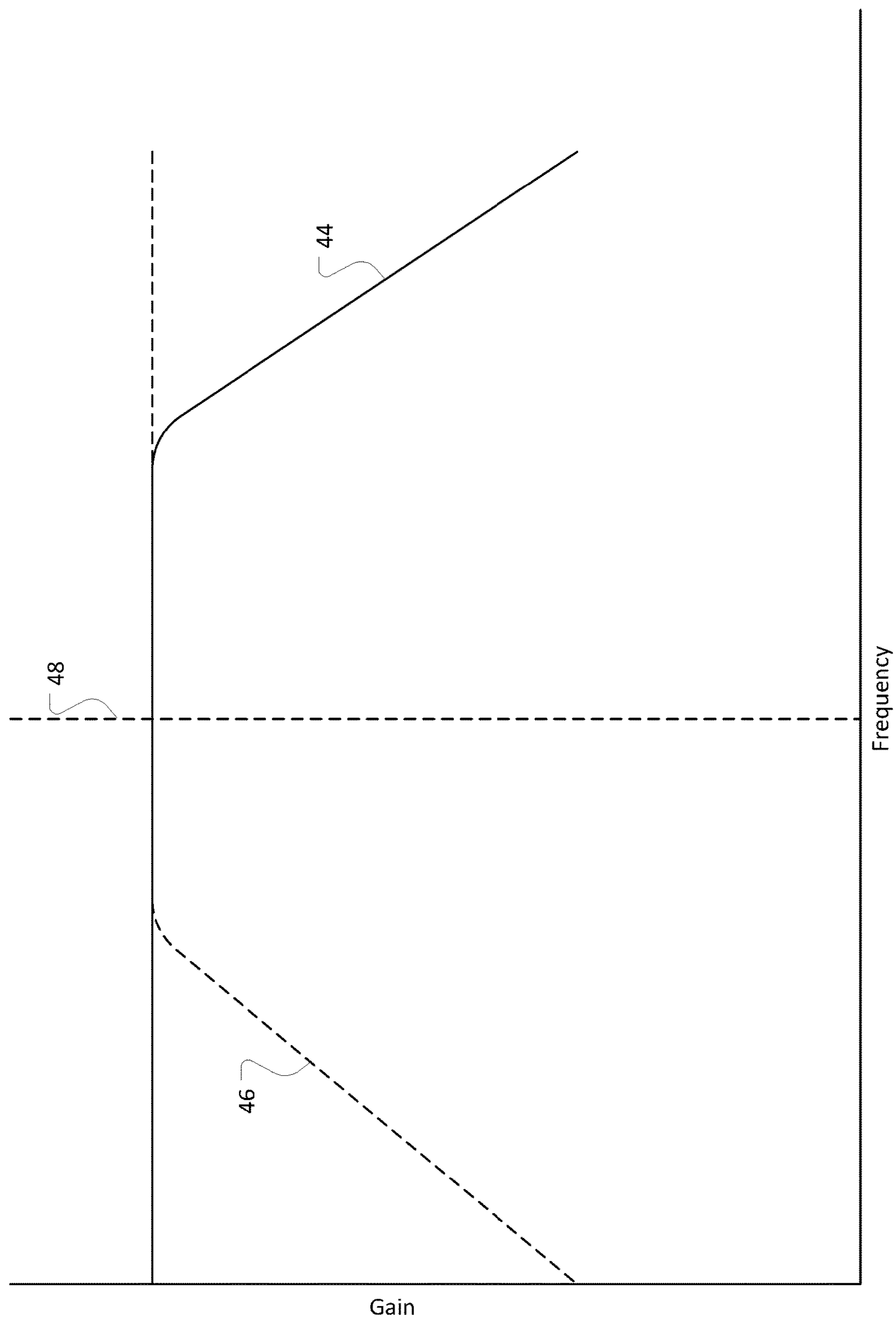
FIG. 3 illustrates an embodiment of filter responses.

In contrast, FIG. 3 has a much differently shaped filter response to the response of FIG. 2. In FIG. 3, the filters have a much wider crossover region. With this embodiment, there is more overlap between the bands and the combining element or other analog signal path components would need to reduce the frequency range in the low-frequency and high-frequency bands such that the output would have a smooth response in the crossover region in transitioning between bands.

Figure 5:
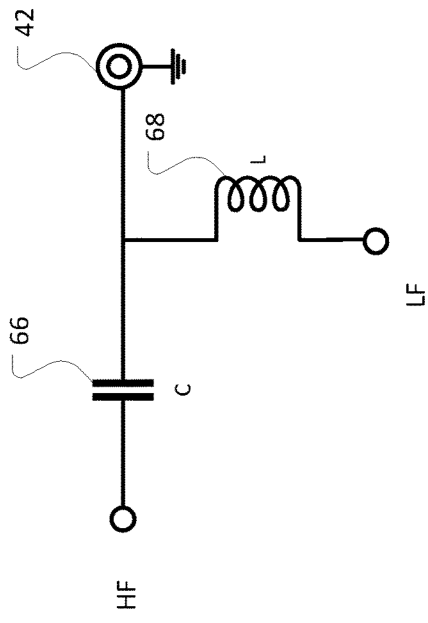
FIGS. 4-7 illustrate embodiments of a passive combining element.
Figure 7:
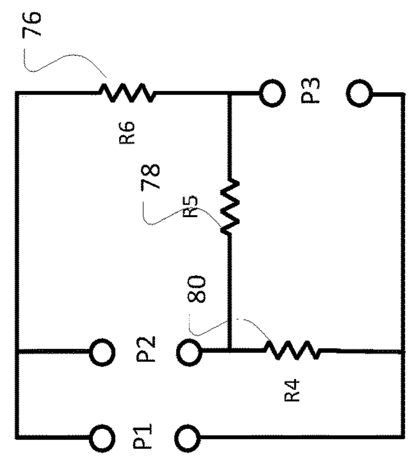
Figure 6:
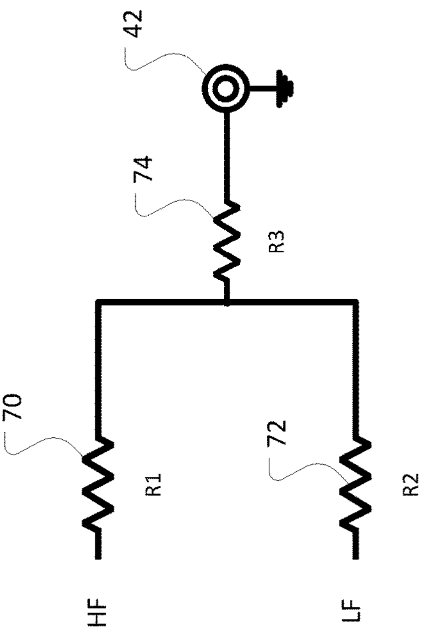

FIGS. 4-7 show different types of combining elements 40: a diplexer (FIG. 4); a bias tee (FIG. 5); and two different resistive combiners (FIGS. 6 and 7). The low-pass 16 and high-pass 26 filters will typically be implemented in the digital signal processor (DSP) mentioned above. There can also be analog filters used in conjunction with the DSP low-pass and high-pass filters in the low-frequency and/or high-frequency signal paths.

Figure 4:
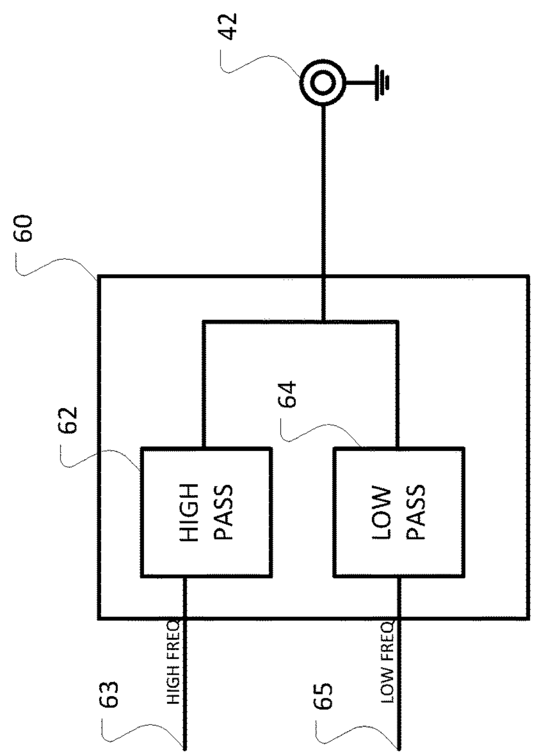

FIG. 4 shows an embodiment of a diplexer 60. The diplexer 60 has internal low-pass and high-pass filters, 62 and 64. It receives the high-frequency analog signal 63 at the high-pass filter 62 and the low-frequency analog signal 65 at the low-pass filter 64. These two filtered signals are then sent to the common connection point 42. In this instance, filters will have the responses such as shown in FIG. 3 for the DSP filters and the diplexer analog filters should be matched to sum to 1, with −6 dB attenuation at the crossover frequency between the bands. The diplexer type of combining element 40 does not strictly require DSP filters, but there are advantages in having them, including using the DSP low-pass filter to perform decimation to reduce the sample rate of the low-frequency band allowing the use of a lower sample rate DAC, and the DSP high-pass filter avoids low frequency content in the high sample rate DAC and allows optimization of the design for output performance versus electromigration, noise, and other considerations.

FIG. 5 shows a bias tee, an example of a discrete analog LC filter comprised of a capacitor 66 connected to the high-frequency (HF) analog signal and an inductor 68 connected to the low-frequency (LF) analog signal. This combiner would typically use DSP low-pass and high-pass filters with responses similar to FIG. 2.

In FIG. 6, the combining element 40 comprises a resistor network of resistors 70, 72 and 74. FIG. 7 shows a combining element 40 that is referred to here as a resistive bridge hybrid, comprising resistors 76, 78, and 80. The port P1 would be the output port, such as connector 42, and P2 and P3 are the input ports, either high-frequency or low-frequency, a reverse from a more conventional approach of using this circuit as a power splitter/divider. Both of these resistive combiners (FIGS. 6 and 7) combine the signals across the entire frequency range. Both of these resistive combiners would typically use DSP low-pass and high-pass filters with responses similar to FIG. 2. The insertion loss for both of these resistive combiners will be approximately −6 dB across the entire frequency range if the high-frequency and low-frequency paths are balanced in power. However, one could make this unbalanced to have less insertion loss on the high-frequency band path and more loss on the low-frequency band path as an example. This extra loss could be overcome by more amplification prior to the resistive combiner. The embodiments similar to those shown in FIGS. 4 and 5 have minimal insertion loss.

One should note that FIG. 7 shows an embodiment that uses differential signaling. All of the embodiments above could also use differential signaling, and the embodiment of FIG. 7 could use single-ended signaling.

In addition to the low-frequency path being optimized for low-frequency and DC signals and the high-frequency path being optimized for AC and high-frequency signals, the split path architecture offers some other benefits as well. For example, the low-frequency signal path can potentially support higher gain and offset ranges compared to what can be supported by the high-frequency path. The low-frequency DAC may have better resolution, increased linearity, and/or other improved performance characteristics because it does not have to cover higher sample rates and frequencies. Having better signal fidelity performance attributes in the low-frequency band signal path relative to what can feasibly be implemented in the high-frequency band signal path can improve several system performance characteristics for the resulting signal source output.

Depending upon the combiner and filters selected, this approach could have more complicated circuitry and hardware than is desirable. It is possible, in some embodiments, to use pattern memories instead of certain components. For example, returning to FIG. 1, the signal generator 12 could be a pattern memory that provides the digital output waveform that eventually becomes the output analog signal. The pattern memory could also be implemented in separate high-frequency and low-frequency pattern memories, one in each path prior to the filters. However, if one desires to reduce the complexity of the circuitry, the pattern memories could be used instead of the high-pass and low-pass filters. An example of such an embodiment is shown in FIG. 8.

Figure 8:
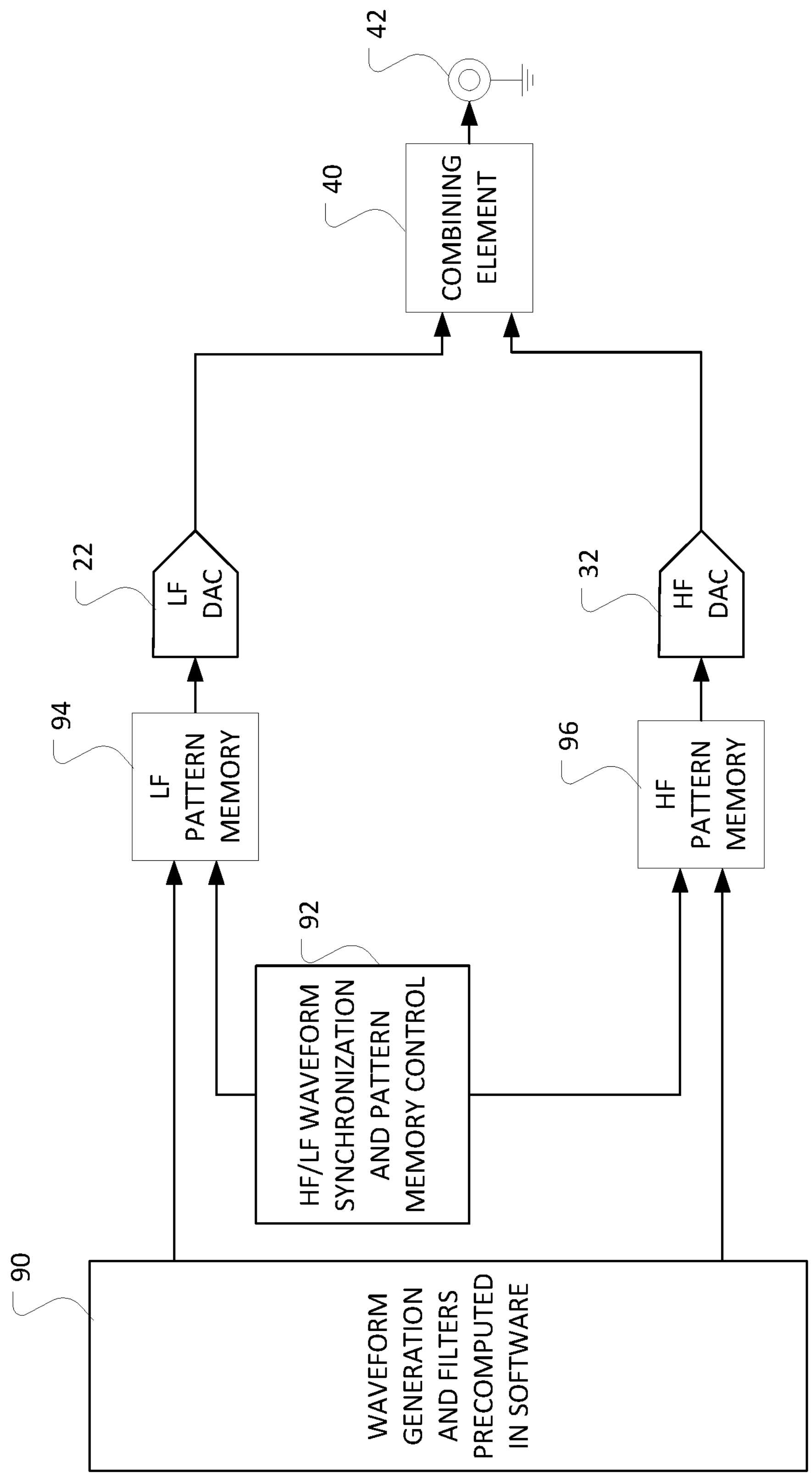
FIG. 8 illustrates an embodiment of a split path using pattern memories.

In FIG. 8, the waveforms and filters are precomputed in software 90, eliminating the need for the filters and the waveform generator. In this embodiment, the pattern memories become the digital signal waveform generator and the high-pass and low-pass filters. The waveform generation and filters that are precomputed in software are loaded into the low-frequency pattern memory 94 and the high-frequency pattern memory 96. The low-frequency DAC 22 and the high-frequency DAC 32 will access the pattern memories under a synchronous control 92 to output the final high-frequency and low-frequency analog signals that are combined by the combining element 40 and output at pin or connector 42.

The above discussion has focused on two signal paths, a high-frequency path and a low-frequency path. However, as mentioned above, the frequencies could be divided into multiple paths. For example, it may be desirable to optimize components for a ‘middle’ frequency path that allows finer tuning of designs by dividing the high-frequency path discussed above into two pieces. No limitation to two frequency bands is intended nor should any be implied.

EXAMPLES

Illustrative examples of the disclosed technologies are provided below. An embodiment of the technologies may include one or more, and any combination of, the examples described below.

Example 1 is a signal generator device, comprising a digital signal waveform generator to produce a digital signal waveform; a first frequency band signal path, comprising a first frequency band filter to receive the digital signal waveform and to pass first frequency band components of the digital signal waveform; and a first digital-to-analog converter to receive the first frequency band components of the digital signal waveform and to produce a first frequency band analog signal; a second frequency band signal path, comprising: a second frequency band filter to receive the digital signal waveform and to pass second frequency band components of the digital signal waveform; and a second digital-to-analog converter to receive the second frequency band components of the digital signal waveform and to produce a second frequency band analog signal; and a combining element to combine the first frequency band analog signal and the second frequency band analog signal to produce a wideband analog signal.

Example 2 is the signal generator device of example 1, further comprising a full band correction filter between the digital signal waveform generator and the first frequency band signal path and the second frequency band signal path.

Example 3 is the signal generator device of either examples 1 or 2, further comprising a first frequency band channel correction filter between the first frequency band filter and the first digital-to-analog converter.

Example 4 is the signal generator device of any of the examples 1-3, further comprising a second frequency band channel correction filter between the second frequency band filter and the second digital-to-analog converter.

Example 5 is the signal generator device of any of the examples 1-4, wherein the first frequency band filter and the second frequency band filter have overlapping passbands implemented in a digital signal processor and the combining element comprises a diplexer.

Example 6 is the signal generator device of any of the examples 1-5, wherein the first frequency band filter and the second frequency band filter comprise matched filters with a summed response to 1 in a digital signal processor and the combining element comprises a discrete analog filter.

Example 7 is the signal generator device of any of the examples 1-6, wherein the first frequency band filter and the second frequency band filter comprise matched filters with a summed response to 1 in a digital signal processor and the combining element comprises a bias tee.

Example 8 is the signal generator device of any of the examples 1-7, wherein the first frequency band filter and the second frequency band filter comprise matched filters with a summed response to 1 in a digital signal processor and the combining element comprises a resistive combiner or bridge.

Example 9 is the signal generator device of any of the examples 1-8, wherein the first frequency band signal path includes an amplifier between the first digital-to-analog filter and the combining element.

Example 10 is the signal generator device of any of the examples 1-9, wherein the second frequency band signal path incudes an amplifier between the second digital-to-analog filter and the combining element.

Example 11 is the signal generator device of any of the examples 1-10, wherein the first frequency signal path includes a down sampling filter having a sampling rate set to support bandwidth in the first frequency band.

Example 12 is the signal generator device of example 11, wherein the first frequency band filter and the downsampling filter are implemented in the same filter.

Example 13 is the signal generator device of any of the examples 1-11, further comprises a third frequency band signal path.

Example 13 is the signal generator device of any of the examples 1-11 and 13, wherein the first frequency band filter comprises a first pattern memory, and the second frequency band filter comprises a second pattern memory.

Example 15 is a method of generating a wideband analog signal, comprising generating a digital waveform; splitting the digital waveform into at least a first frequency band signal and a second frequency band signal; converting the first frequency band signal into a first frequency band analog signal; converting the second frequency band signal into a second frequency analog signal; and combining the first frequency band analog signal with the second frequency band analog signal to produce the wideband analog signal.

Example 16 is the method of example 15, wherein splitting the digital waveform into the first frequency signal band comprises applying a first frequency band filter to the digital waveform to produce the first frequency band signal, and applying a second frequency band filter to the digital waveform to produce the second frequency band signal.

Example 17 is the method of either example 15 or example 16, wherein generating digital waveform comprises accessing a pattern memory to retrieve the digital waveform.

Example 18 is the method of any of the examples 15-17, wherein generating the digital waveform, and converting the first frequency band signal into a first frequency band analog signal comprises accessing a first pattern memory to retrieve the first frequency band analog signal, and converting the second frequency band signal into a second frequency band analog signal comprises accessing a second pattern memory to retrieve the second frequency band analog signal.

Example 19 is the method of example 18, further comprising accessing the first pattern memory and accessing the second pattern memory with synchronization.

Example 20 is the method of any of the examples 15-18, wherein splitting the digital waveform into at least a first frequency band signal and a second frequency band signal comprises splitting the digital waveform into at least a third frequency band signal.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A signal generator device, comprising:

a digital signal waveform generator to produce a digital signal waveform;

a first frequency band signal path, comprising:

a first frequency band filter to receive the digital signal waveform and to pass first frequency band components of the digital signal waveform; and a first digital-to-analog converter to receive the first frequency band components of the digital signal waveform and to produce a first frequency band analog signal;

a second frequency band signal path, comprising:

a second frequency band filter to receive the digital signal waveform and to pass second frequency band components of the digital signal waveform; and a second digital-to-analog converter to receive the second frequency band components of the digital signal waveform and to produce a second frequency band analog signal; and a combining element to combine the first frequency band analog signal and the second frequency band analog signal to produce a wideband analog signal, wherein the combining element is selected based on frequency responses of the first frequency band filter and the second frequency band filter.

2. The signal generator device as claimed in claim 1, further comprising a full band correction filter between the digital signal waveform generator and the first frequency band signal path and the second frequency band signal path.

3. The signal generator device as claimed in claim 1, further comprising a first frequency band channel correction filter between the first frequency band filter and the first digital-to-analog converter.

4. The signal generator device as claimed in claim 1, further comprising a second frequency band channel correction filter between the second frequency band filter and the second digital-to-analog converter.

5. The signal generator device as claimed in claim 1, wherein the first frequency band filter and the second frequency band filter have overlapping passbands implemented in a digital signal processor and the combining element comprises a diplexer.

6. The signal generator device as claimed in claim 1, wherein the first frequency band filter and the second frequency band filter comprise matched filters with a summed response to 1 in a digital signal processor and the combining element comprises a discrete analog filter.

7. The signal generator as claimed in claim 1, wherein the first frequency band filter and the second frequency band filter comprise matched filters with a summed response to 1 in a digital signal processor and the combining element comprises a bias tee.

8. The signal generator as claimed in claim 1, wherein the first frequency band filter and the second frequency band filter comprise matched filters with a summed response to 1 in a digital signal processor and the combining element comprises a resistive combiner or bridge.

9. The signal generator device as claimed in claim 1, wherein the first frequency band signal path includes an amplifier between the first digital-to-analog filter and the combining element.

10. The signal generator device as claimed in claim 1, wherein the second frequency band signal path incudes an amplifier between the second digital-to-analog filter and the combining element.

11. The signal generator device as claimed in claim 1, wherein the first frequency signal path includes a down sampling filter having a sampling rate set to support bandwidth in the first frequency band.

12. The signal generator device as claimed in claim 11, wherein the first frequency band filter and the downsampling filter are implemented in the same filter.

13. The signal generator device as claimed in claim 1, further comprising a third frequency band signal path.

14. The signal generator device as claimed in claim 1, wherein the first frequency band filter comprises a first pattern memory, and the second frequency band filter comprises a second pattern memory.

15. A method of generating a wideband analog signal, comprising:

generating a digital waveform;

splitting the digital waveform into at least a first frequency band signal and a second frequency band signal;

converting the first frequency band signal into a first frequency band analog signal;

converting the second frequency band signal into a second frequency analog signal; and combining the first frequency band analog signal with the second frequency band analog signal to produce the wideband analog signal;

wherein splitting the digital waveform into the first frequency signal band comprises applying a first frequency band filter to the digital waveform to produce the first frequency band signal, and applying a second frequency band filter to the digital waveform to produce the second frequency band signal; and wherein combining the first frequency band analog signal with the second frequency band analog signal is performed by a combining element selected based on frequency responses of the first frequency band filter and the second frequency band filter.

16. The method as claimed in claim 15, further comprising applying a full band correction filter to the digital waveform prior to splitting the digital waveform into the first frequency band filter and the second frequency band filter.

17. The method as claimed in claim 15, wherein generating digital waveform comprises accessing a pattern memory to retrieve the digital waveform.

18. A method of generating a wideband analog signal, comprising:

generating a digital waveform;

splitting the digital waveform into at least a first frequency band signal and a second frequency band signal;

converting the first frequency band signal into a first frequency band analog signal;

converting the second frequency band signal into a second frequency analog signal; and combining the first frequency band analog signal with the second frequency band analog signal to produce the wideband analog signal;

wherein generating the digital waveform and splitting the digital waveform into at least a first frequency band signal and a second frequency band signal comprises accessing a first pattern memory to retrieve the first frequency band signal, and accessing a second pattern memory to retrieve the second frequency band signal, further comprising accessing the first pattern memory and accessing the second pattern memory with synchronization.

19. The method as claimed in claim 15, wherein splitting the digital waveform into at least a first frequency band signal and a second frequency band signal comprises splitting the digital waveform into at least a third frequency band signal.

* * * * *